United States Patent
Di Fabbrizio et al.

(10) Patent No.: US 9,257,116 B2
(45) Date of Patent: *Feb. 9, 2016

(54) SYSTEM AND DIALOG MANAGER DEVELOPED USING MODULAR SPOKEN-DIALOG COMPONENTS

(71) Applicant: AT&T Intellectual Property II, L.P., Atlanta, GA (US)

(72) Inventors: Giuseppe Di Fabbrizio, Florham Park, NJ (US); Charles Alfred Lewis, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,549

(22) Filed: Apr. 25, 2014

(65) Prior Publication Data

US 2014/0324427 A1    Oct. 30, 2014

Related U.S. Application Data

(63) Continuation of application No. 13/926,366, filed on Jun. 25, 2013, now Pat. No. 8,725,517, which is a continuation of application No. 12/201,423, filed on Aug. 29, 2008, now Pat. No. 8,473,299, which is a (Continued)

(51) Int. Cl.
*G10L 21/06*    (2013.01)
*G10L 21/00*    (2013.01)
(Continued)

(52) U.S. Cl.
CPC .................. *G10L 15/06* (2013.01); *G10L 15/28* (2013.01); *G10L 21/00* (2013.01); *G10L 21/06* (2013.01); *G06F 17/20* (2013.01); *G06F 17/26* (2013.01); *H04M 1/642* (2013.01); *Y10S 707/99932* (2013.01)

(58) Field of Classification Search
USPC ................. 704/231, 246, 251–257, 270–278; 379/67.1–72, 87–88.06, 88.13, 379/88.16–88.26, 90.01–93.03
See application file for complete search history.

(56) References Cited

U.S. PATENT DOCUMENTS

| 4,326,101 A | 4/1982 | Sakoe |
| 5,268,990 A | 12/1993 | Cohen et al. |

(Continued)

OTHER PUBLICATIONS

Survey of Existing Interactive Systems, Peter Bohlin, Johan Bos, Staffan Larsson, Ian Lewin, Colin Matheson, David Milward, The TRINDI Project, Department of Linguistics, Goteborg University, Gothenburg, Sweden, Feb. 1999.

(Continued)

*Primary Examiner* — Pierre-Louis Desir
*Assistant Examiner* — David Kovacek

(57) ABSTRACT

A dialog manager and spoken dialog service having a dialog manager generated according to a method comprising selecting a top level flow controller based on application type, selecting available reusable subdialogs for each application part, developing a subdialog for each application part not having an available subdialog and testing and deploying the spoken dialog service using the selected top level flow controller, selected reusable subdialogs and developed subdialogs. The dialog manager capable of handling context shifts in a spoken dialog with a user. Application dependencies are established in the top level flow controller thus enabling the subdialogs to be reusable and to be capable of managing context shifts and mixed initiative dialogs.

20 Claims, 5 Drawing Sheets

Related U.S. Application Data continuation of application No. 10/790,495, filed on Mar. 1, 2004, now Pat. No. 7,421,393.

(60) Provisional application No. 60/470,824, filed on May 15, 2003.

(51) Int. Cl.
| | |
|---|---|
| *G06F 17/20* | (2006.01) |
| *G06F 17/26* | (2006.01) |
| *G10L 15/06* | (2013.01) |
| *G10L 15/28* | (2013.01) |
| *H04M 1/64* | (2006.01) |

(56) References Cited

U.S. PATENT DOCUMENTS

| | | | |
|---|---|---|---|
| 5,488,570 A | | 1/1996 | Agarwal |
| 5,559,897 A | | 9/1996 | Brown et al. |
| 5,597,312 A | * | 1/1997 | Bloom et al. ............ 434/362 |
| 5,634,086 A | | 5/1997 | Rtischev et al. |
| 5,699,456 A | * | 12/1997 | Brown et al. ............ 382/226 |
| 5,719,997 A | | 2/1998 | Brown et al. |
| 5,799,276 A | | 8/1998 | Komissarchik et al. |
| 5,890,123 A | | 3/1999 | Brown et al. |
| 5,960,384 A | | 9/1999 | Brash |
| 6,023,697 A | | 2/2000 | Bates et al. |
| 6,044,347 A | | 3/2000 | Abella et al. |
| 6,073,098 A | | 6/2000 | Buchsbaum et al. |
| 6,134,524 A | | 10/2000 | Peters et al. |
| 6,144,938 A | | 11/2000 | Surace et al. |
| 6,236,968 B1 | | 5/2001 | Kanevsky et al. |
| 6,246,981 B1 | | 6/2001 | Papineni et al. |
| 6,314,402 B1 | | 11/2001 | Monaco et al. |
| 6,356,869 B1 | | 3/2002 | Chapados et al. |
| 6,466,899 B1 | | 10/2002 | Yano et al. |
| 6,505,162 B1 | | 1/2003 | Wang et al. |
| 6,513,009 B1 | | 1/2003 | Comerford et al. |
| 6,587,818 B2 | | 7/2003 | Kanevsky et al. |
| 6,728,679 B1 | | 4/2004 | Strubbe et al. |
| 6,738,518 B1 | * | 5/2004 | Minka et al. ............ 382/218 |
| 6,751,591 B1 | | 6/2004 | Gorin et al. |
| 6,941,266 B1 | | 9/2005 | Gorin et al. |
| 6,961,694 B2 | | 11/2005 | Schmid et al. |
| 6,983,252 B2 | | 1/2006 | Matheson et al. |
| 7,024,350 B2 | * | 4/2006 | Schmid et al. ............ 704/9 |
| 7,139,717 B1 | | 11/2006 | Abella et al. |
| 7,197,460 B1 | | 3/2007 | Gupta et al. |
| 7,240,009 B2 | | 7/2007 | Jost et al. |
| 7,397,905 B1 | * | 7/2008 | Stewart et al. ............ 379/88.01 |
| 7,412,393 B1 | * | 8/2008 | De Fabbrizio et al. ....... 704/275 |
| 7,421,393 B1 | * | 9/2008 | Di Fabbrizio et al. ....... 704/275 |
| 7,430,510 B1 | * | 9/2008 | De Fabbrizio et al. ....... 704/275 |
| 7,552,055 B2 | | 6/2009 | Lecoeuche |
| 7,603,651 B2 | * | 10/2009 | De Brabander ............ 717/105 |
| 7,720,684 B2 | * | 5/2010 | Huerta et al. ............ 704/257 |
| 7,805,305 B2 | * | 9/2010 | Badt et al. ............ 704/257 |
| 8,473,299 B2 | * | 6/2013 | Di Fabbrizio et al. ....... 704/275 |
| 8,630,859 B2 | * | 1/2014 | DiFabbrizio et al. ......... 704/275 |
| 2001/0013001 A1 | | 8/2001 | Brown et al. |
| 2001/0049603 A1 | | 12/2001 | Sravanapudi et al. |
| 2002/0001370 A1 | | 1/2002 | Walker et al. |
| 2002/0013961 A1 | | 2/2002 | Kleinert |
| 2002/0099535 A1 | | 7/2002 | Schmid et al. |
| 2002/0123881 A1 | | 9/2002 | Schmid et al. |
| 2002/0135618 A1 | | 9/2002 | Maes et al. |
| 2002/0193907 A1 | | 12/2002 | Young et al. |
| 2002/0198719 A1 | | 12/2002 | Gergic et al. |
| 2003/0105634 A1 | | 6/2003 | Abella et al. |
| 2003/0171925 A1 | | 9/2003 | Werner |
| 2004/0006475 A1 | | 1/2004 | Ehlen et al. |
| 2004/0006480 A1 | | 1/2004 | Ehlen et al. |
| 2004/0073431 A1 | | 4/2004 | Galanes et al. |
| 2004/0176945 A1 | | 9/2004 | Inagaki et al. |
| 2005/0165607 A1 | * | 7/2005 | Di Fabbrizio et al. ....... 704/256 |
| 2008/0091429 A1 | | 4/2008 | Badt et al. |
| 2008/0184164 A1 | | 7/2008 | DiFabbrizio et al. |
| 2008/0306743 A1 | * | 12/2008 | Di Fabbrizio et al. ....... 704/275 |
| 2008/0319763 A1 | | 12/2008 | DiFabbrizio et al. |
| 2010/0091954 A1 | | 4/2010 | Dayanidhi et al. |
| 2014/0324427 A1 | * | 10/2014 | Di Fabbrizio et al. ....... 704/243 |

OTHER PUBLICATIONS

David Stallard, "Talk'n'travel: a conversational system for air travel planning," ANLC '00 Proceedings of the sixth conference on Applied Natural Language Processing, pp. 68-75, Association for Computational Linguistics: Stroudsburg, PA, 2000.

\* cited by examiner

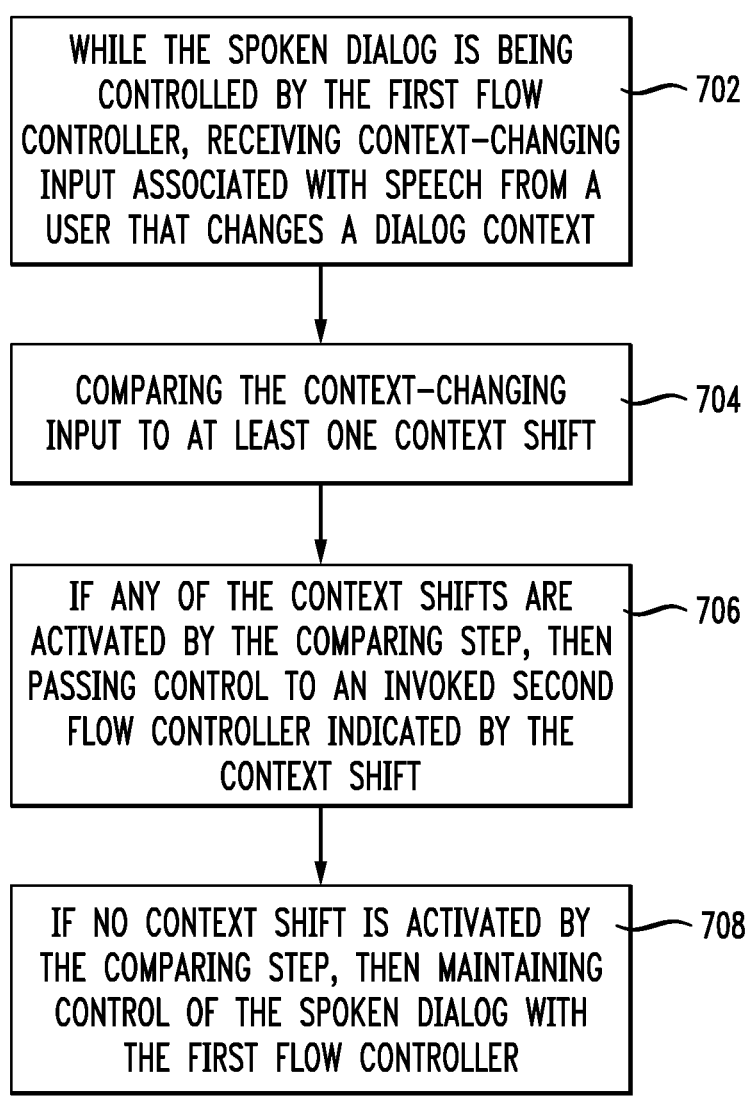

US 9,257,116 B2

SYSTEM AND DIALOG MANAGER DEVELOPED USING MODULAR SPOKEN-DIALOG COMPONENTS

PRIORITY

The present application is a continuation of U.S. patent application Ser. No. 13/926,366, filed Jun. 25, 2013, which is a continuation of U.S. patent application Ser. No. 12/201,423, filed on Aug. 29, 2008, now U.S. Pat. No. 8,473,299, issued Jun. 25, 2013, which is a continuation of U.S. patent application Ser. No. 10/790,495, filed on Mar. 1, 2004, now U.S. Pat. No. 7,421,393, issued Sep. 2, 2008, which is a non-provisional application of U.S. Provisional Patent Application No. 60/470,824, filed May 15, 2003, the contents of which are incorporated herein by reference in their entirety.

RELATED APPLICATIONS

This application is related to the following applications: U.S. patent application Ser. No. 10/763,085, filed Jan. 22, 2004, now abandoned, entitled "System and Method to Disambiguate and Clarify User Intention in a Spoken Dialog System"; U.S. patent application Ser. No. 10/790,159, filed Mar. 1, 2004, now U.S. Pat. No. 7,412,393, entitled "Method for Developing a Dialog Manager Using Modular Spoken-Dialog Components"; and U.S. patent application Ser. No. 10/790,517, filed Mar. 1, 2004, now U.S. Pat. No. 7,430,510, entitled "System and Method of Using Modular Spoken-Dialog Components to Handle Context Shifts in Spoken Dialog Systems". The contents of these applications are incorporated herein by reference in their entirety.

BACKGROUND OF THE INVENTION

1. Field of the Invention

The present invention relates to spoken dialog systems and more specifically to spoken dialog system and a dialog manager generated using a reusable dialog modular development approach.

2. Introduction

The present invention relates to spoken dialog systems and to the dialog manager module within such a system. The dialog manager controls the interactive strategy and flow once the semantic meaning of the user query is extracted. There are a variety of techniques for handling dialog management. Several examples may be found in Huang, Acero and Hon, *Spoken Language Processing, A Guide to Theory, Algorithm and System Development*, Prentice Hall PTR (2001), pages 886-918. Recent advances in large vocabulary speech recognition and natural language understanding have made the dialog manager component complex and difficult to maintain. Often, existing specifications and industry standards such as Voice XML and SALT (Speech Application Language Tags) have difficulty with more complex speech applications.

Development of a dialog manager continues to require highly-skilled and trained developers. The process of designing, developing, testing and deploying a spoken dialog service having an acceptably accurate dialog manager is costly and time-consuming. As the technology continues to develop, consumers further expect spoken dialog systems to handle more complex dialogs. As can be appreciated, higher costs and technical skills are required to develop more complex spoken dialog systems. Given the improved ability of large vocabulary speech recognition systems and natural language understanding capabilities, what is needed in the art is a system and method that provides an improved development process for the dialog manager in a complex dialog system. Such improved method should simplify the development process, decrease the cost to deploy a spoken dialog service, and utilize reusable components. In so doing, the improvement method should also enable the author of a dialog system to focus efforts on the key areas of content that define an individual application.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

An embodiment of the invention relates to a dialog manager for use within a spoken dialog service, the dialog manager generated according to a method comprising selecting a top level flow controller, selecting available reusable subdialogs for each application part below the top level flow controller, developing a subdialog for each application part not having an available subdialog and testing and deploying the spoken dialog service using the selected top level flow controller, selected reusable subdialogs and developed subdialogs. The top level flow controller, reusable subdialogs and developed subdialogs interact with each other independent of their decision model. In other words, dialog modules designed using rule-based decision models, recursive transition network (RTN) decision models or other decision models can all seamlessly communicate with each other without the need of the developer to design specific rules governing their interaction. In this regard, functions that are dependent on or specific to a particular application, such as presenting the top book sales associated a bookseller website, are not associated with the reusable subdialogs. Further, when a user causes a context shift while a reusable subdialog is controlling the conversation, the system returns a context shift indication and a destination state and returns control of the dialog to a top level controller or parent dialog. This enables the subdialogs to be reusable in different applications. Other embodiments of the invention include but are not limited to (1) a modular subdialog having certain characteristics such that it can be selected and incorporated into a dialog manager below a top level flow controller. The modular subdialog can be called up by the top level flow controller to handle specific tasks and receive context data and return data to the top level flow control gathered from its interaction with the user as programmed; (2) a dialog manager generated according to the method set forth herein; (3) a computer readable medium storing program instructions or spoken dialog system components; and (4) a spoken dialog service having a dialog manager generated according to the process set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates another method aspect of the invention associated with context shifts.

DETAILED DESCRIPTION OF THE INVENTION

The various embodiments of the invention will be explained generally in the context of AT&T speech products and development tools. However, the present invention is not limited to any specific product or application development environment.

Figure 1:
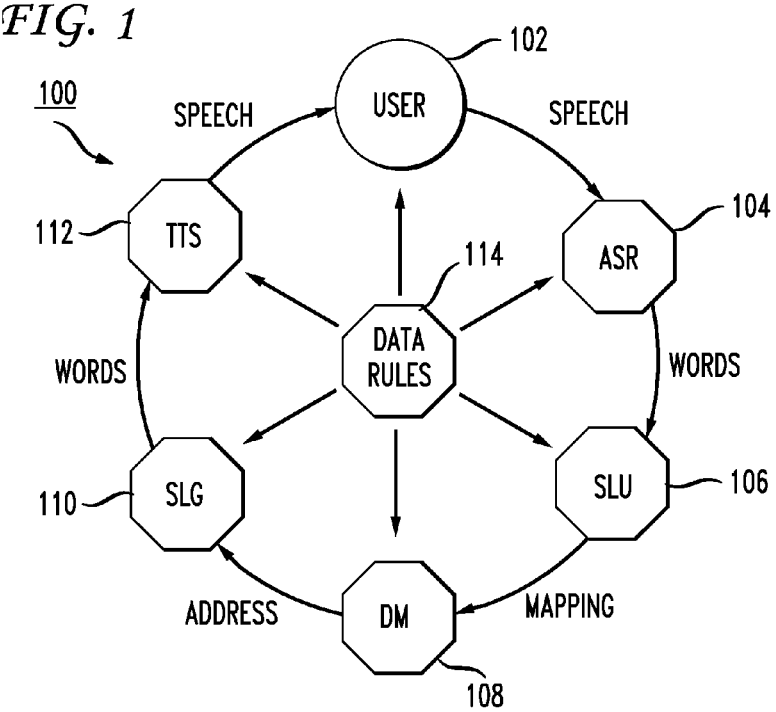
FIG. 1 illustrates the basic spoken dialog service.

FIG. 1 provides the basic modules that are used in a spoken dialog system 100. A user 102 that is interacting with the system will speak a question or statement. An automatic speech recognition (ASR) module 104 will receive and process the sound from the speech. The speech is recognized and converted into text. AT&T's Watson ASR component is an example of such an ASR module. The text is transmitted to a spoken language understanding (SLU) module 106 (or natural language understanding (NLU) module) that determines the meaning of the speech, or determines the user's intent in the speech. This involves interpretation as well as decision: interpreting what task the caller wants performed and determining whether there is clearly a single, unambiguous task the caller is requesting—or, if not, determining actions that can be taken to resolve the ambiguity. The NLU 106 uses its language models to interpret what the caller said. The NLU processes the spoken language input wherein the concepts and other extracted data are transmitted (preferably in XML code) from the NLU 106 to the DM application 108 along with a confidence score. The (DM) module 108 processes the received candidate intents or purposes of the user's speech and generates an appropriate response. In this regard, the DM 108 manages interaction with the caller, deciding how the system will respond to the caller. This is preferably a joint process of the DM engine 108 running on a Natural Language Services (NLS) platform (such as AT&T's infrastructure for NL services, for example) and the specific DM application 108 that it has loaded and launched. The DM engine 108 manages dialog with the caller by applying the compiled concepts returned from the NLU 106 to the logic models provided by the DM application 108. This determines how the system interacts with a caller, within the context of an ongoing dialog. The substance of the response is transmitted to a spoken language generation component (SLG) 110 which generates words to be spoken to the caller 102. The words are transmitted to a text-to-speech module 112 that synthesizes audible speech that the user 102 receives and hears. The SLG 110 either plays back pre-recorded prompts or real-time synthesized text-to-speech (TTS). AT&T's Natural Voices® TTS engine provides an example of a TTS engine that is preferably used. Various types of data and rules 114 are employed in the training and run-time operation of each of these components.

An example DM 108 component is the AT&T Florence DM engine and DM application development environment. The present invention relates to the DM component and will provide a novel approach to development and implementation of the DM module 108. Other embodiments of the invention include a spoken dialog system having a DM that functions according to the disclosure here, a DM module independent of a spoken dialog service or other hardware or firmware, a computer-readable medium for controlling a computing device and various methods of practicing the invention. These various embodiments will be understood from the disclosure here.

A spoken dialog system or dialog manager (as part of a spoken dialog system) will operate on a computing device such as the well-known computer system having a computer processor, volatile memory, a hard disc, a bus that transmits information from memory through the processor and to and from other computer components. Inasmuch as the basic computing architecture and programming languages evolve, the present invention is not limited to any specific computing structure but may be operable on any state-of-the-art device or network configuration.

AT&T's Florence dialog management environment provides a complete framework for building and testing advanced natural language automated dialog applications. The core of Florence is its object-oriented framework of Java classes and standard dialog patterns. This serves as an immediate foundation for rapid development of dialog infrastructure with little or no additional programming.

Along with a dialog infrastructure, Florence offers tools to create a local development and test environment with many convenient and time-saving features to support dialog authoring. Florence also supplies a key runtime component for the VoiceTone Dialog Automation platform—the Florence Dialog Manager (DM) engine, an Enterprise Java Bean (EJB) on the VoiceTone/NLS J2EE application server. Once a DM application is deployed on a platform such as the VoiceTone platform, the DM engine uses the logic built into the application's dialogs to manage interactions with end-users within the context of an on-going dialog.

Whatever a dialog flow control logic model is active, the DM application 108 will determine, for example, whether it is necessary to prompt the caller to get confirmation or clarification and whether the caller has provided sufficient information to establish an unambiguous course of action. When the task to be performed is unambiguous, the DM engine's output processor uses the DM application's dialog components and output template to prepare appropriate output. Output is most often formatted as VoiceXML code containing speech text prompts that will be used to generate a spoken response to the caller.

Note that although VoiceXML is the most typical output, a DM application 108 can also be configured to provide output in any XML-based language only replacing the appropriate output template. The DM application 108 may also generate output configured in other ways. When plain text output is sufficient (as might be the case during application development/debugging), Florence's own simple output processor can be used in lieu of any output template. The DM's spoken language generator (SLG) 110 helps generate the system's response to the caller 102. Output (such as VoiceXML code with speech text, for example) generated by the Florence output processor using a specific output template is run through the SLG 110 before it is sent to a text-to-speech (TTS) engine 112. In real production grade services, both the DM and 108 the NLU 106 engines are preferably Enterprise Java Beans (EJBs) running on the NLS J2EE application server. The ASR and TTS engines communicate with the NLS server via a telephony server or some other communication means. Using EJBs is one way to implement the business logic and servlets or JSP pages are also alternative standard-based options.

A DM application supplies dialog data and logical models pertaining to the kinds of tasks a user might be trying to perform and the dialog manager engine implements the call flow logic contained in the DM application to assist in completing those tasks. As tasks are performed, the dialog manager is also updating the dialog history (the record of the system's previous dialog interaction with a caller) by logging information representing an ongoing history of the dialog, including input received, decisions made, and output generated.

Florence DM applications can be created and debugged in a local desktop development environment before they are deployed on the NLS J2EE application server. The Florence Toolkit includes a local copy of the XML schema, a local command line tool, and a local NLU server specifically for this purpose. Ultimately, however, DM applications that are to be deployed on the NLS server need to be tested with to NLS technology components residing on the J2EE server.

An important concept defined in the Florence DM is the Flow Controller (FC) logic. A Flow Controller is the abstraction for pluggable dialog strategy modules. The dialog strategy model controls the flow of dialog when a user "converses" with the system. Dialog strategy implementations can be based on different types of dialog flow control logic models. Different algorithms can be implemented and made available to the DM engine without changing the basic interface. For example, customer care call routing systems are better described in terms of RTNs (Recursive Transition Networks). Complex knowledge-based tasks could be synthetically described by a variation of knowledge trees. Clarification FCs are basically decision trees, where dialog control passes from node to node along branches and are discussed in U.S. patent application Ser. No. 10/763,085, filed Jan. 22, 2004, now abandoned, entitled "System and Method to Disambiguate and Clarify User Intention in a Spoken Dialog System". Plan-based dialogs are effectively defined by rules and constraints (rule-based). Florence FC provides a synthetic XML-based language to author the appropriate dialog strategy. Dialog strategy algorithms are encapsulated using object oriented paradigms. This allows dialog authors to write sub-dialogs with different algorithms, depending on the nature of the task and use them interchangeably exchanging variables through the local and global contexts. The disclosure below relates to RTN FCs.

RTN FCs are finite state models, where a dialog control passes from one state to another and transitions between states have specific triggers. This decision system uses the notion of states connected by arcs. The path through the network is decided based on the conditions associated with the arcs. Each state is capable of calling a new subdialog. Additional types of FC implementations include a rules-based model. In this model, the author writes rules which are used to make decisions about how to interact with the user. The RTN FC is the preferred model for automated customer care services. All the FC family of dialog strategy algorithms, such as the RTN FC, the clarification FC, and the rule-based FC implementations support common dialog flow control features, such as context shifts, local context, actions, and subdialogs.

In general, the RTN FC is a state machine that uses states and transitions between states to control the dialog between a user and a DM application. Where some variables are defined at the state level (using slots, for example, as a local context), these are often referred to as Augmented Transition Networks. See, e.g., D. Bobrow and B. Fraser, "An Augmented State Transition Network Analysis Procedure", *Proceedings of the IJCAI*, pages 557-567, Washington D.C., May 1969. For simplicity, the present document refers to RTNs only. If an application is using an RTN FC implementation in its currently active dialog, when the DM application receives user input, the DM engine applies the call logic defined in that RTN FC implementation to respond to the user in an appropriate manner. The RTN FC logic determines which state to advance to based on the input received from the caller. There may be associated sets of instructions that will be executed upon entering this state. (A state can have up to four or more instruction sets.) The transition from one state to another may also have an associated set of conditions that must be met in order to move to the next state or associated actions that are invoked when the transition occurs.

Next is described a possible implementation of RTNs using an XML-based language. Each RTN state is defined in the XML code of a dialog data file with a separate <state> element nested within the overall <states> element. The attributes of an RTN <state> element include name, subdialog and pause. The name attribute is the identifier of the state; it can be any string. The subdialog attribute is the name of the FC invoked as a subdialog. If this attribute is left out, the state will not create a subdialog. The pause attribute determines whether the RTN FC will pause. If this is set to true, the RTN controller will pause before exiting to get new user input. Note that if the state invokes a subdialog, it will not pause before the subdialog is invoked, but will pause after it returns control. For example:

```
<state name="GET_SELECTION" subdialog="InputSD"
pause="false"> <!--since pause is false,
it will not wait for new input after the subdialog--> <state >
```

Two aspects of state behavior should be noted. First, all instructions that modify the local context of the FC occur inside of states. Second, only states modify the local context of an RTN FC by executing instructions. Transitions (see below) do not execute instructions, although they can execute actions. The behavior of a state occurs in stages. In a preferred embodiment, there are six stages, as described below. These are only exemplary stages, however, and other stages are contemplated as within the scope of the invention.

The first stage relates to state entry instructions. The <enterstate> set of instructions is executed immediately when a transition delivers control to the state. If a state is reached by a context shift or a chronoshift, these instructions are not executed. A chronoshift denotes a request to back trace the dialog execution to a previous dialog turn. Chronoshifts typically also involved removing a previous dialog from the stack to give control to the previous dialog. Also, the initial state of an RTN does not execute these instructions; however, if the RTN FC passes control to this state because it is the default state of the RTN FC, it will execute these instructions. The following is an example from a dialog file's XML code where a <set> element nested within an <enterstate> element includes entry instructions:

```
<state name="SPANISH_STATE"> <enterstate> <set name="salutation"
expr="Adios!"/> </enterstate> </state>
```

The second stage relates to subdialog creation. If the state has a subdialog, then it is created at this stage. The name of the subdialog is provided as the value of the subdialog= attribute of the <state> element. The following is an example of the syntax for a <state> element which calls a subdialog named InputSD:

<state name="GET_SELECTION" subdialog="InputSD"/>

The third stage relates to subdialog entry instructions. The <entersubdialog> set of instructions is invoked when the state creates a subdialog. Typically, instructions in this stage affect both the dialog and the subdialog. For example, the <set> instruction will retrieve values from the parent dialog and set values in the subdialog. This is useful for passing arguments to a subdialog before it executes. In one aspect of the invention, the invoked subdialog is pushed to the stop of the stack of dialog modules so that the invoked subdialog can manage the spoken dialog and interact with the user.

The fourth stage relates to subdialog execution. If a subdialog was created in stage 2 (the subdialog creation stage), it is started in this stage. Input will be directed to the subdialog until it returns control to the dialog.

The fifth stage relates to subdialog exit instructions. The <exitsubdialog> set of instructions is invoked when the subdialog returns control to the dialog. Typically, instructions in this stage affect both the dialog and the subdialog. This is useful for retrieving values from a subdialog when it is complete. In one aspect of the invention, when the control of the spoken dialog exits from an invoked subdialog module, the subdialog module is popped off the dialog module stack.

The sixth stage relates to state exit instructions. The <exitstate> set of instructions is executed when a transition is used to exit a state or the RTN shifts control to the default state. These instructions are not executed if the state is left by a context shift or chronoshift, nor are they executed if this is a final state in this RTN. The six stages of a state and associated instruction sets are summarized in the table below. When a state has passed through all six of these stages (including those with no associated instructions) it will advance to a new state.

TABLE 1

State Instruction Sets

| Stage | Instruction Set |
|---|---|
| State Entry | Use an <enterstate> element with a <set> element nested within it to identify a set of instructions associated with entering this state. |
| Subdialog Creation | No instructions are used in this stage, however, the subdialog attribute of the <state> element can be used to identify the subdialog being called. |
| Subdialog Entry | Use an <entersubdialog> element with a <set> element nested within it to identify a set of instructions associated with entering this subdialog. |
| Subdialog Execution | No instructions are used in this stage. |
| Subdialog Exit | Use an <exitsubdialog> element with a <set> element nested within it to identify a set of instructions associated with exiting this subdialog. |
| State Exit | Use an <exitstate> element with a <set> element nested within it to identify a set of instructions associated with exiting this state. |

Each RTN transition is defined in the XML code of the dialog file with a separate <transition> element nested within the overall <transitions> element. The attributes of a <transition> element include: name=, from=, to=, and else=. For example:

```
<transition name="GERMAN_SELECTED" from="GET_SELECTION" to="GERMAN_STATE" else="true">
```

In this example, the name= attribute is the identifier for the RTN transition. It can be any unique string. The from= attribute is the identifier of the source state, and the to= attribute is the identifier of the destination state. The else= attribute determines whether and when other transitions can be used. If the else= attribute is given a "true" value, then this transition will only be invoked if no other transitions can be used.

Each <transition> can have a set of conditions defined in a <conditions> element. This element must be evaluated to true in order for the transition to be traversable. Each <transition> can also have an element of type <actions>. This element contains the <action> elements which will be executed if this transition is selected. The following example comes from a sample application where callers order foreign language movies:

```
<transition name="FRENCH_SELECTED"
    from="GET_SELECTION"
    to="FRENCH_STATE"> <actions>
    <action>FRENCH_MOVIE</action> </actions>
    <conditions> <cond oper="eq" expr1="$successfulInput"
    expr2="true" />  <cond oper="eq"
    expr1="$language" expr2="french" />
    </conditions> </transition>
```

Transitions can have conditions and actions associated with them, but not instructions. Transitions do not execute instructions; only states can affect the local context in an RTN FC.

There are conditions associated with each transition. A transition can have an associated set of conditions which must all be fulfilled in order to be traversed—or, it can be marked as an "else transition", which means it will be traversed if no other transition is eligible. Transitions with conditions that have been satisfied have priority over else transitions. If a transition has no conditions, it is treated as an else transition. If multiple transitions are eligible, which of the transitions will be selected as undefined—and which else transition will be selected if there is more than one is also undefined. Here is an example of a transition with two conditions:

```
<transition name="ENGLISH_SELECTED" from="GET_SELECTION"
to="ENGLISH_STATE"> <conditions> <cond oper="eq"
expr1="$successfulInput"
```

```
expr2="true"/> <cond oper="eq" expr1="$language" expr2="english"/>
</conditions>
</transition>
```

Here is an example of an else condition:

```
<transition name="ENGLISH_SELECTED" from="GET_SELECTION"
to="ENGLISH_STATE" else = "true"/>
```

There are also actions associated with each transition. In addition to moving the RTN to a new state, another effect of traversing a transition is execution of actions associated with that transition. An action is used to communicate with the application user. A transition can invoke any number of actions. This is an example of a transition with an action:

```
<transition name="INTRO_PROMPT"
    from="START_STATE"
    to="CORRECT_STATE"> <actions>
    <action>INTRO_PROMPT</action>
</actions> </transition>
```

The RTN FC is responsible for keeping track of action data. In the example above, INTRO_PROMPT is a label that is used to look up the action data. In addition to states and transitions, other components of the RTN FC include: Local context, Context shifts, Subdialogs and Actions.

The concept of a local context, implemented in the XML code of the dialog data file with the <context> element, is particularly important. Local context is a memory space for tracking stored values in an application. These values can be read and manipulated using conditions and instructions. Instructions modify the local context from RTN states. Context shifts are implemented with the <contextshifts> element. Each context shift defined in the dialog requires a separate <contextshift> element nested within the overall <contextshifts> tags. The named state of a context shift corresponds to an RTN state.

Subdialogs may be defined with individual <dialogfile> elements nested within an overall <subdialogs> element. Subdialogs can be invoked by the states of an RTN FC. Actions are defined with individual <actiondef> elements nested within an overall <actiondefs> element. Actions can be invoked by the transitions of an RTN FC. The RTN FC also has some unique properties, such as the start state and default state attributes, which can be very useful. In an application's FXML dialog files, the start= and default= attributes of the <rtn> element allow the developer to specify the start state (the name of the state that the RTN FC starts in) and the default state (the name of the state that the RTN FC defaults to if no other state can be reached). Again, from the movie rental example:

<rtn name="MovieRentalSD" start="START_STATE" default="DEFAULT_STATE"></rtn>

There are, by way of example, three types of values that can be stored in the local context of an RTN or Clarification FC implementation: local context variables, a local context array and a dictionary array. Other values may be stored as well. A local context variable is a key/value pair that matches a variable name string to a value string. Other variables that may be available include offer typed variables and numeric operations. For example:

<var name="successfulInput" expr="false"/>

The normal <array> contains numerically indexed <var> elements. These elements do not have to have a name attribute. The <dictionary> element can contain <var> elements referenced by their names. Both types can also contain other arrays. For example:

<array name="SilenceActions"><var expr="SILENCE1"/><var expr="SILENCE2"/></array>

As mentioned above, local context variables can be referred to in conditions and instructions. Every FC implementation will provide some way to do this. Flow controllers also share a global context area across subdialogs and different flow controllers. Variables declared in the global context are accessible by all the FC and any subdialog. Typically, condition elements are used to check the state of the local context and return "true" or "false," while instructions are used to manipulate values and members of the local context. Instructions can also modify the actions of an FC. Within an FC, it is common to see strings that reference values in the local context. For example, $returnValue references the value of the variable named returnValue. This convention is frequently used in conditions and instructions.

Conditions may be specified with the <cond> or <ucond> elements. The <cond> element takes two arguments, the <ucond> element only accepts one. The following condition types are available in an RTN or clarification FC implementation: Equal conditions, Greater-than conditions, Less-than conditions and XPath conditions.

Equal (eq) returns true if the first argument is equal to the second. If they are both numeric, a numeric comparison will be made. Either argument may use the $ syntax to refer to local context variables. For example:

<cond oper="eq" expr1="$inputConcept" expr2="discourse_yes"/>

Greater-than (gt) returns true if the first argument is greater than the second. Otherwise it is identical to EQCondition. For example:

<cond oper="gt" expr1="$inputConfidence" expr2="0.8"/>

Less-thanReturns (lt) returns true if the first argument is less than the second. Otherwise identical to EQCondition. For example:

<cond oper="lt" expr1="$inputConfidence" expr2="0.8"/>

The XPath condition may also be used. This condition uses XPath syntax to check a value in the local context. This is especially useful when a value is described as an XML document, such as the results from the NLU. It is true if the element searched for exists. An example of the XPath condition is:

<ucond oper="xpath" expr="result/interpretation/input/noinput"/>

A context shift is a challenging type of transition to encode throughout an entire application, and it may prevent reuse of existing subdialogs that do not include it. The context shift mechanism defines the transition for the entire dialog, and passes it on to subdialogs as well. This means that even if the developer is using a standardized subdialog for, for instance, gathering input, this transition will still be active in the unmodified subdialog.

A context shift is based on two pieces of information: the input which triggers the shift, and the name of the state where the shift goes (for example, to a different FC, where the concept of state is not specified i.e., rule-based, the system will specify the destination as a subdialog name instead of a specific state). When a subdialog is created, it inherits the context shifts of its parent dialog. If a shift is fired, the subdialog returns a message that a shift has occurred and the parent dialog is set to the state described by the shift. The only time that a subdialog does not inherit a context shift is when it already has a shift defined for the same trigger concept.

For example, Table 2 shows the context shifts defined for dialog A:

TABLE 2

Context Shifts Example - Dialog A Definitions

| Trigger Concept | Set Destination State |
|---|---|
| Car | "Car rental" |
| Hotel | "Hotel reservation" |
| Plane | "Flight reservation" |

Table 3 shows the context shift defined for dialog B:

TABLE 3

Context Shifts Example - Dialog B Definitions

| Trigger Concept | Set Destination State |
|---|---|
| Car | "Get car type" |

Then, when A calls B, the context shifts of B will be as shown in Table 4:

TABLE 4

Context Shifts Example - When Dialog A Calls Dialog B

| Trigger Concept | Set Destination State |
|---|---|
| Car | "Get car type" |
| Hotel | Dialog A: "Hotel reservation" |
| Plane | Dialog A: "Flight reservation" |

It is also possible for an FC to override the shift. For example, the RTN FC allows states to ignore context shifts if specified conditions are met. Suppose the author wanted to prevent looping in the "Get car type" state. This state could be made exempt from the context shift in order to allow a different action to occur if the concept "Car" was repeated. Note that creating an exemption like this is a good authoring technique for avoiding infinite loops.

An example output of the application development process is a set of XML (*.fxml) application files, including an application configuration file and one or more dialog files (one top level dialog and any number of sub level dialogs). All application files are preferably compliant with various types of XML schema.

Figure 2:
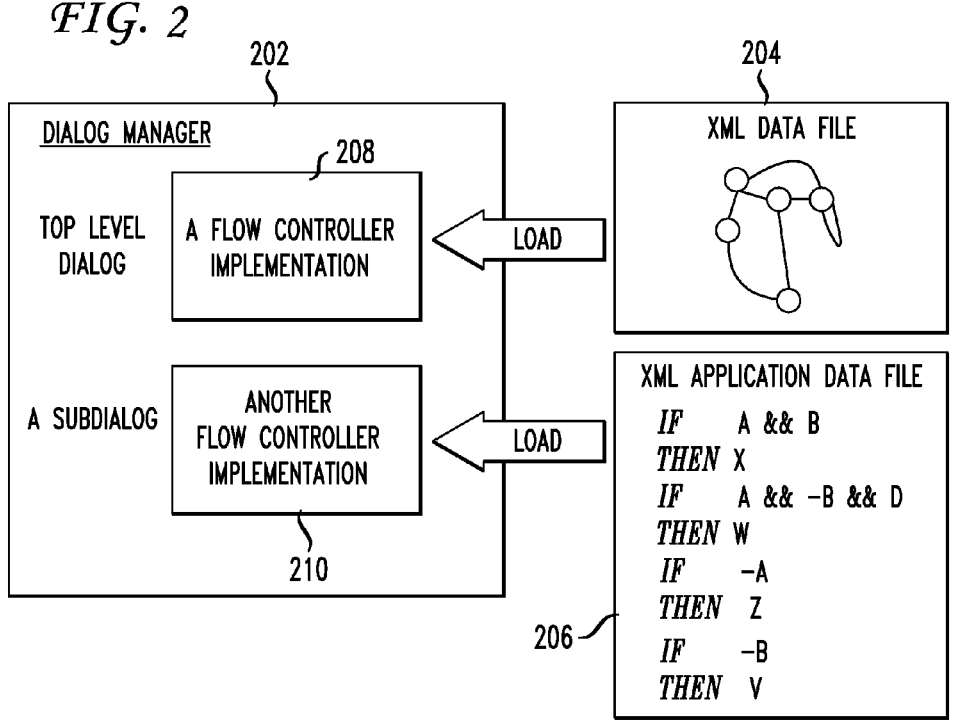
FIG. 2 illustrates a flow controller in the context of a dialog manager.

FIG. 2 illustrates a dialog manager with several flow controllers. This figure represents a DM 202 with a loaded flow controller 208 for a top level dialog from an XML data file 204. Another flow controller 210 is loaded from an XML application data file 206. Each dialog and subdialog typically has an associated XML data file. The use of multiple flow controllers provides in the present invention an encapsulated, reusable and customizable approach to a spoken dialog. The reusable modules do not have any application dependencies and therefore are more capable of being used in a mixed-initiative conversation. This provides an interface definition for a fully encapsulated dialog logic module and its interaction with other FCs. Modular or reusable subdialogs have the characteristics that they are initialized by a parent dialog before activation, input is sent to a subdialog until it is complete, results can be retrieved by the parent dialog and context shifts can return flow control to the parent dialog.

Examples of reusable subdialogs that may be employed to either provide just information to the user or engage in a dialog to obtain information may include a telephone number, a social security number, an account number, an e-mail address, a home or business address, or other topics.

The development system and method of the invention supports component-based development of complex dialog systems. This includes support for the creation and re-use of parameterized dialog components and the ability to retrieve values from these components using either local results or global variables. An example of the reusable components includes a subdialog that requests credit-card information. This mechanism for re-usable dialog components pervades the entire system, providing a novel level of support for dialog authors. The author can expect components to operate successfully with respect to the global parameters of the application. Examples of such global parameters comprise the output template and context shift parameters. The components can be used recursively within the system, to support recursive dialog flows if necessary. Therefore, while a subdialog is controlling the conversation, if a context shift occurs, the subdialog is isolated from the application dependencies (such as a specific piece of information that the application provides like the top selling books on amazon.com). Being isolated from the application dependencies allows for the subdialog to indicate a context shift and transfer control back to another module without trying to continue down a pre-determined dialog.

Figure 3:
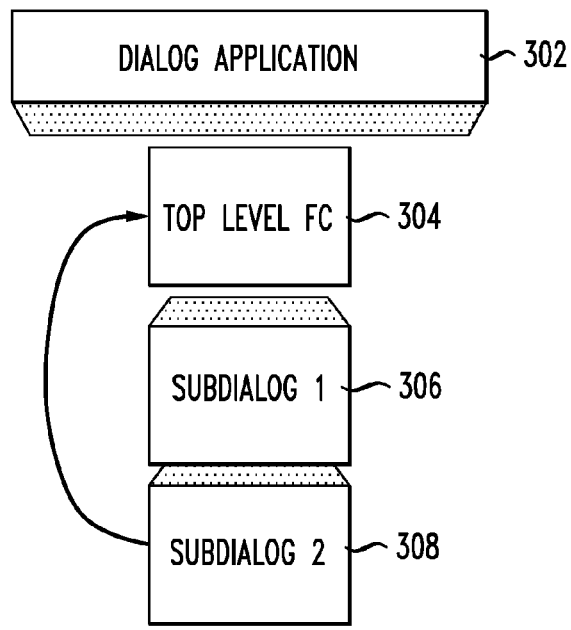
FIG. 3 illustrates a dialog application top level flow controller and example subdialogs.
Figure 4:
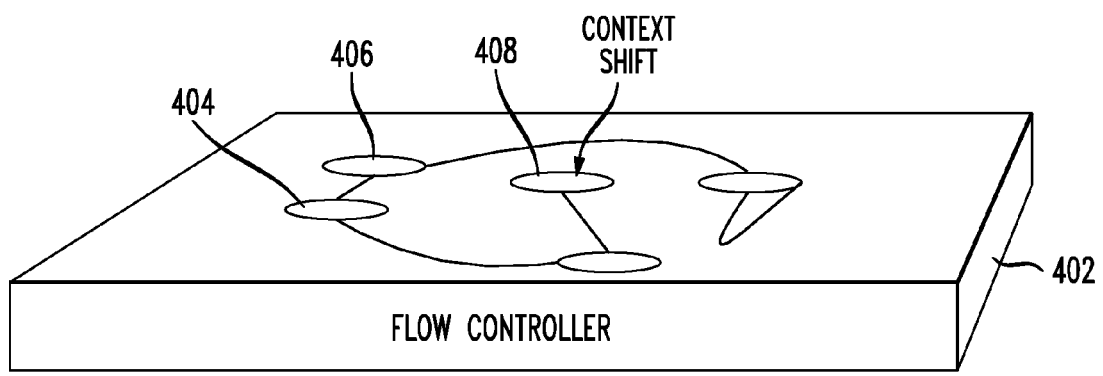
FIG. 4 illustrates a context shift associated with a flow controller.

FIGS. 3 and 4 illustrate the use of subdialogs and context shifts. FIG. 3 illustrates a mixture of types of dialog modules. The control of the dialog at any given time lies within the respective dialog module, which is a logical description of a part of a dialog. The dialog module is referred to as a subdialog module when it is handed control by another dialog module. As shown in FIG. 3, the dialog application 302 relates to the spoken dialog service such as the AT&T VoiceTone customer care application. The top level FC 304 is loaded as well as several other subdialog FCs such as subdialog-1 306 and subdialog-2 308. Encapsulation allows each FC 306 and 308 to be loaded separately into the application and the same protocol may always be used for invocation of a subdialog.

Furthermore, context shifts can go between different types of FCs or between models of subdialog modules. In this regard, a component-based dialog system as developed by the approach disclosed herein allows different decision models of dialogs, such as recursive transition networks (RTN) and rule based systems, to interact seamlessly within an application. The algorithms for these dialog models are integrated into the system itself. This means that the author who wants to use an RTN does not have to explain how RTNs work, nor how they interact with other dialog properties. Similarly, if the author wants to create a rule-based dialog, they do not have to create their own rule-based algorithm; instead they can focus on the content. Individual subdialogs are fully encapsulated with regard to the model they are based on, so once a subdialog is created using one of the built-in logical models, the subdialog can freely interact with other subdialogs of any model. For example, a subdialog which is a rule-based dialog for collecting user information can be called by a top level dialog which is a simple RTN used to route a call.

FIG. 3 also assists in understanding the concept of the stack. A dialog system generated according to this invention operates by using a stack. The top dialog module in the stack is indicated in the parameters of the application. When a subdialog is called, it is pushed onto the stack, and when it exits it is popped off of the stack. The control of the dialog always lies with the subdialog at the top of the stack, i.e. the most recently added dialog which has not yet been popped.

Information can be passed between dialog modules when the modules are pushed or popped. There is also a global memory space which can be used by any dialog module. There is a common implementation of local memory which allows information to be passed to and from a subdialog when it is created and completed, respectively. Within each module, the state of the dialog at any moment is described in the language of the decision algorithm used by that dialog module.

FIG. 4 illustrates a flow controller 402 having several states 404, 406. A context shift is illustrated as returning control to a specific state 408 within the FC 402. A number of common patterns in dialog development are incorporated into this process to simplify the task of DM creation. These strategies, such as context shifts, chronological shifts, digressions, confirmation, clarification, augmentation, cancel, correction, multi-input, relaxation, repeat, re-prompt and undo have been incorporated into the framework itself. Other strategies following the same pattern of usage may also be incorporated. This allows a particular strategy during a spoken dialog to be easily included if desired, or ignored otherwise.

Several of the dialog module strategies are described next. A context shift allows the author to describe sudden shifts in conversation. Context shifts can be defined in any dialog module, and passed down to all subsequent subdialogs. The definition of the context shift describes the state in the defining dialog module that will be returned to in the event that the conditions of the shift are met. The conditions of the shift are described in terms of the common memory structure used by all dialog modules, and may include references to the global memory of the system. When the context shift is fired, control returns to the dialog module where it was defined, popping all subdialog modules off of the control stack.

Chronological shift reflect the common user requests to repeat information, or to correct previous input. The type of input which constitutes each of these shifts can be defined in any dialog module, and it will be passed along to subdialogs.

Digressions are also similar to context shifts in the way that they are defined and passed to subdialogs. The difference is that rather than returning control to the dialog module where they are defined, they initiate a new subdialog which is takes control of the conversation. Once the digression subdialog is completed, control returns to the module that had control before the digression.

A confirmation module confirms an answer and often occurs often within a voice application, and may be required for other dialog strategies. When a context shift occurs, for example, the system might require confirmation from the user before the shift is executed. The author of the dialog application can create a single dialog module, or use and existing dialog module for all of these tasks. The module that will be used is indicated at the application level, and will be used by all occasions of confirmation throughout the application. Confirmation occurs when certain data supplied by the user requires explicit confirmation (no matter what confidence level the NLU has returned). This might be done by requesting that the user choose between two tasks, for example.

Correction occurs when the user corrects or changes information (thus requiring the system to loop back to a previous state or pursue another kind of decision path). Multi-input occurs when the user volunteers more input than they have been prompted to supply (and the system captures this info so that later the user only needs to verify information already provided). Reprompting occurs when the DM application presents a caller with a repeat prompt using slightly different wording.

When the DM author wishes to uses any of these patterns, the control structure is already in place so they can focus on the parameters of the structure that are specific to their application. Context shifts, for example, require a way to ensure that certain key phrases (such as "quit", "start over", or a complete change of topic) or conditions will trigger an application specific response, even when a pre-existing dialog definition is being re-used.

Support of a Context Shift dialog pattern allows the application to react to abrupt changes in the flow of conversation with a user. A context shift is one of the more tedious types of transitions to encode throughout an entire application, and it typically prevents reuse of existing subdialogs that do not include it. The context shift mechanism defines the transition for the entire dialog, and passes it on to subdialogs as well. This means that even if the developer is using a standardized subdialog for, for instance, gathering input, this transition will still be active in the unmodified subdialog.

A context shift is based on two pieces of information: the input which triggers the shift, and the name of the state where the shift goes. When a subdialog is created, it inherits the context shifts of its parent dialog. If a shift is fired, the subdialog returns a message that a shift has occurred and the parent dialog is set to the state described by the shift. The only time that a subdialog does not inherit a context shift is when it already has a shift defined for the same trigger concept.

In the digression idiom, the application must not only respect key phrases or conditions (such as "explain" or "help"), but also be able to restore the previous state of the dialog when it is complete. These patterns do not have to be explained by the author, they are already understood by the system. This makes it possible for them to be used without having to specify the application-independent aspects of the feature.

Figure 6:
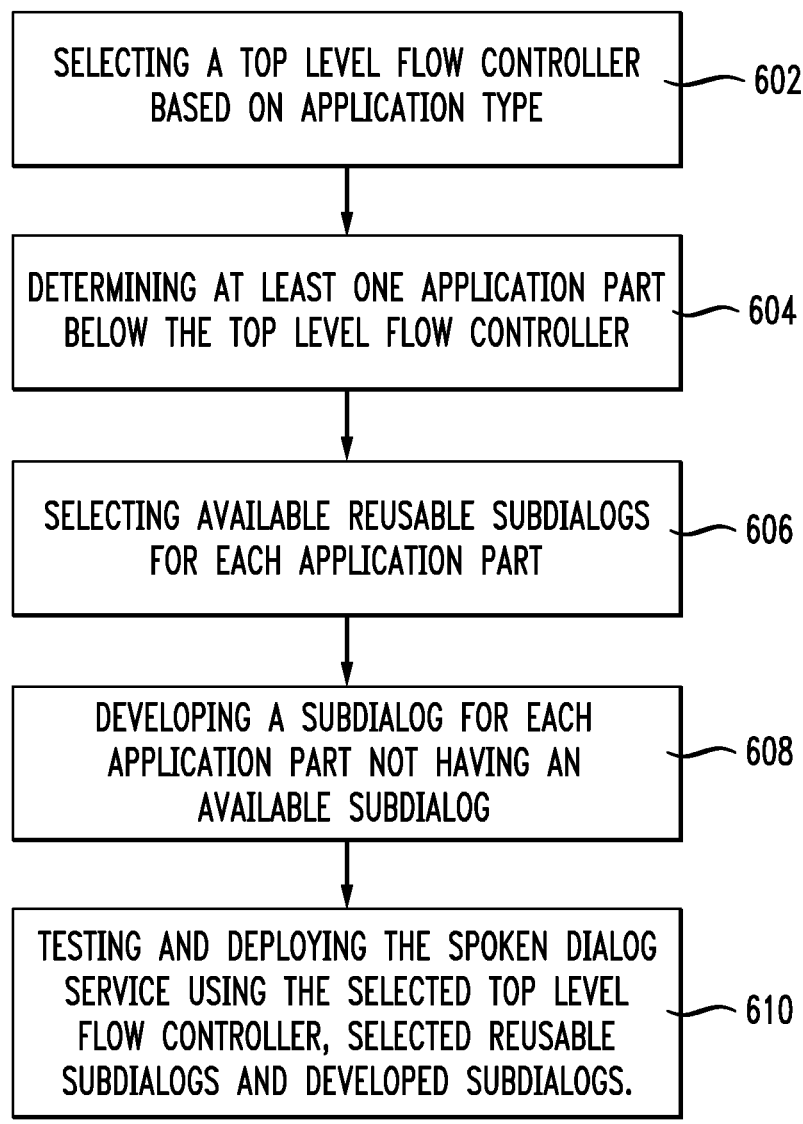
FIG. 6 illustrates a method aspect of the present invention.

FIG. 6 illustrates exemplary steps that are performed in the method embodiment of the invention. As shown, the developer may implement the dialog strategy by selecting the top level flow controller type (602) as determined by the type of application. Although there might be applications that require a Clarification or Rules FC as the top level dialog, the RTN FC is generally the appropriate type of top level dialog for most applications. Because RTNs are general state machines, they are usually the right FC for a call flow application. Next, the developer breaks the application down into parts that require different FCs below that top level (604). Based on types of subdialogs the developer intends to write, for example, one may want to incorporate tree logic and/or a rules-based module nested within the states transition module. The developer checks for available subdialogs and selects reusable subdialogs for each application part (606). For example, the reusable InputSD and other subdialogs will be in a developer's library. Thus there are a variety of application parts below the top level flow controller that may be determined Where a subdialog is not available, the method comprises developing a subdialog for each application part that does not have an available subdialog (608). Once available subdialogs and developed subdialogs are selected, the developer will test and deploy the spoken dialog service using the selected top-level flow controller, selected subdialogs and developed subdialogs (610).

FIG. 2 represents a dialog manager 202 with a loaded flow controller 208 for a top level dialog from an XML data file 204. Another flow controller 210 is loaded from an XML application data file 206. The use of multiple flow controllers provides in the present invention an encapsulated, reusable and customizable approach to a spoken dialog. This provides an interface definition for a fully encapsulated dialog logic module and its interaction with other FCs.

The DM application framework with modular logic (DMML) permits the system developer to choose dialog strategy appropriate to the service domain and combine strategies as appropriate. Several concepts make this workable. These include the FC and local context, introduced above.

The local context is applied within each FC 208, 210 to maintain the state of the FC and is independent of the dialog algorithm implemented therein. It is also used to communicate values between FCs. An example of a context shift is when a user decides to pursue a new or different goal before the existing goal is completed or the user wants to start the process over. For example, if the user is communicating with a spoken dialog service associated with a bank, the user may be in a dialog to obtain a checking account balance. Part way through the dialog, the user may suddenly request to transfer money from one account to another account. Thus, a context shift occurs that may require the implementation of a subdialog to handle the money transfer context. The availability of modular subdialogs for selection by the developer to implement the spoken dialog with the user provides many advantages in terms of time to deployment and cost of development of the spoken dialog system.

Other dialog patterns may also be implemented using the modular approach disclosed herein. For example, a correction pattern can be implemented to handle the situation where the user corrects or changes information previously given. A multi-input pattern can be handled where the user volunteers more information then he or she has been asked to give. Further, in some cases, explicit confirmation of input is required no matter the NLU confidence.

The multiple flow controllers can provide interchange between each flow controller using a recursive transition network (RTN) which involves storing and manipulating states, transitions and actions between various FCs. In one aspect of the invention, the modular flow controllers are implemented in a rule-based manner where actions are based on certain criteria, a silent count and rejection count are maintained, and slot values are filled or unfilled.

The subdialogs that are initiated (see 210 FIG. 2) may be initialized by a parent dialog before activation. An input is sent to a subdialog until its use is complete. Results can be retrieved by a parent dialog and context shifts can also return flow control to a parent dialog. The process of encapsulation involves loading each FC into the dialog manager application separately. In this regard, the same protocol is used for invocation and for communicating and switching flow control among FCs. The context shifts allow the control to pass between different types of FCs.

Finally, context shifts permit abrupt transitions between FCs. FIG. 7 illustrates a method aspect of the invention associated with managing context shifts between FCs. These transitions are defined in a manner that permits each FC to describe a destination for the jump in a customized manner, and to pass the definition of this jump to FCs of other types. This feature allows the content author to seamlessly use diverse systems of dialog logic in combination. Internally, the DMML maintains a stack of FCs, for example a first FC and a second FC. While the spoken dialog is being managed by a current FC, the system will receive input associated with the user speech and provide responses according to the particular context of the FC. In this dialog, the user may want to switch contexts of the conversation (e.g., from account balance information to a transaction between accounts). The spoken dialog system will then receive input associated with the user speech that includes information indicating that a context switch is desired by the user (702). When the current FC invokes a second FC, the second FC is added to the stack and will be the recipient of all new inputs from the spoken dialog until it has relinquished control to the parent or first FC. Context shifts are inherited by the second FC, and values may be copied from the local context of the first FC. When new input is received, it is passed to the most recent FC, where it is first compared to at least one context shift (704). The context shifts may be stored within a table. If any of the context shifts are activated, control is passed to the new FC indicated by the context shift, and the FC is set to the state that the shift describes (706). If no context shift is activated, control passes to the logic of the first FC (708). The current FC can return control to a previous FC whenever its logic dictates.

The discussion now returns to the development process. As the developer reviews the library of available subdialogs, the developer may determine whether a new subdialog needs to be developed. The subdialog strategy will have been largely determined by the SLU concepts generated during the design phase. General discourse concepts such as YES and NO are available (for example, the developer will see that the basic Input Subdialog uses discourse_yes and discourse_no for confirmation if the SLU confidence score is too low). Other pre-assigned prompts for use in special circumstances may be associated with the reusable input subdialogs. Specific subdialogs, like BILLING, CREDIT_CARD, and so forth are available. The developer lists all the prompts that may be used. Note that the RTN actions can be completed with the real actions defined as prompts and grammar activation in the call flow. While the developer is working in the keyboard mode (using the Florence Command Line tool) during development, he or she will just input the expected text for the prompt. Later, when the system is ready to be deployed on the NLS platform the developer will need VoiceXML snippets with the actual prompt definitions (either pre-recorded prompts pointers or text-to-speech commands).

The developer determines what customization the application requires (i.e., additional java for customized algorithms) and creates application files (an application configuration data file, a top level dialog data file and any necessary subdialog data files) based on a dialog strategy. If necessary, the developer creates an output processing template (or adapt one of the sample templates provided in the Florence or other developer's Toolkit) to format the output for the application. Most DM applications include a template file that functions as the output processor, formatting application output as XHTML, XML or VoiceXML code. When a template is included among the application files, the application's configuration data file element is given a template attribute. The value of that attribute is the template filename (eg, template="VoiceXMLTemplate.vxml"). Florence's simple output processor may be used when it is appropriate such as when plain text is acceptable application output—for example, when the application is being developed, debugged or tested using a command line tool to provide text input and text output. (In this case, template="text" is used instead of a template filename.)

Figure 5A:
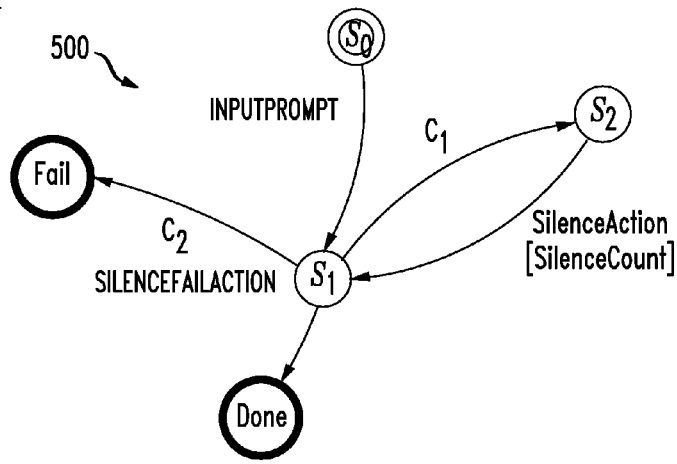
FIG. 5A illustrates a reusable subdialog.

Next is discussed the details of building the DM application files, including use of the Florence XML schema and application file templates. Reuse of subdialogs (from other existing Florence applications or other applications) is also covered. FIG. 5A illustrates a reusable subdialog. In this case, the reusable subdialog 500 is an input flow controller. The states include an $S_1$ state for receiving input from the user. $S_0$ is an input prompt state. This particular group of states illustrates how to handle silence in the input FC 500. If silence is heard, the transition $C_1$ takes the flow to state $S_2$ which increments the silence count and returns the flow to the get input state $S_1$ with a silent count parameter. This interaction continues if more silence is heard until the silent count reaches a threshold value, represented by a $C_2$ transition to the fail state. If input is received appropriately, then the flow may transition to the done state. In this example, error prompt and the silent count threshold values may be parameters transmitted to this RTN subdialog.

Figure 5B:
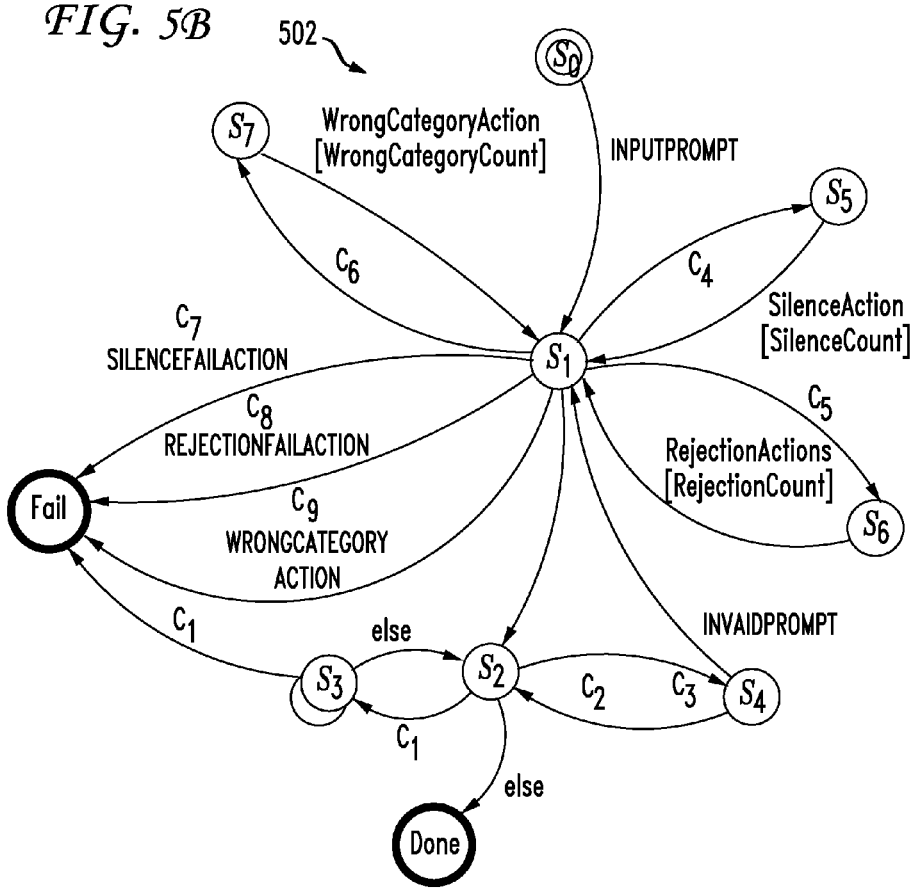
FIG. 5B illustrates an RTN reusable subdialog.

FIG. 5B illustrates a more complex RTN reusable subdialog 502. In this case, the input prompt $S_0$ transitions to state $S_1$ which receives the user input. This subdialog handles silence, rejection, a wrong category and a confirmation interaction with the user. If silence is heard, the $C_4$ transition goes to state $S_5$ which increments the SilentCount parameter. If a wrong category is received, a wrong category transition $C_6$ transitions to state $S_7$ which increments a WrongCategoryCount parameter and returns to state $S_1$. A rejection input results in a $C_5$ rejection action transition to state $S_6$ which increments a RejectionCount parameter. As these parameters each reach a threshold value, then the following transitions may bring the flow to the fail state: $C_7$ for a SilenceFailAction; $C_8$ for a RejectionFailAction; and $C_9$ for a WrongCategoryAction transition. If user input is received at state $S_1$, that requires confirmation, the flow transitions to state $S_2$ that performs a confirmation interaction with the user, represented by states $S_3$ and $S_4$ and transitions $C_1$, $C_2$, and $C_3$, which transition to either the fail state or the done state. In this manner, the spoken dialog system can confirm user input.

Note that the top-level dialog of an application must be identified in a <dialogfile> element in an application configuration data file. All other dialogs in an application are considered subdialogs that can be called from that top-level dialog—or from other subdialogs in the application. Any subdialogs that will be called must be declared in <dialogfile> tags within the <subdialogs> element in the code of the calling dialog file.

Building an application configuration data file is discussed next. A Florence application's configuration file provides key information, such as what the top-level dialog of the application is, what output processor is used, what NLU engine is used, what types of debugging information and log messages will be captured, and so forth. The structure and content of an application configuration data file based on the config.fxml template is generally as follows:

```
<xml>
<fxml>
<configuration>
<dialogfile/>
<nlu/>
<output/>
</configuration>
</fxml>
</xml>
```

The fxml element tag, which is the parent for all other FXML tags used, establishes this as a Florence application file using the FXML schema. The configuration tag establishes the file as an application configuration data file type and contains child elements used to define specific configuration data. The dialogfile tag identifies the top-level dialog of this application. The NLU tag specifies the location of input data by providing host and port number for the NLU (ie, the NLU engine which is to supply the compiled and interpreted data generated from the application user's natural language input).

The output tag identifies the type of output expected from this DM application and the template, if any, that will format the output.

In a typical voice application, this would probably be a VXML template used to format the DM output as VXML. That VXML would be processed by the Florence SLG before and then sent to the Natural Voices TTS engine or prompt player, which would generate a spoken response for the application user.

The process of building a global context file is discussed next. The global context file is specified by path and filename in an application's configuration data, using the globals= attribute of the <configuration> element. This allows global context to be accessed by any dialog or subdialog in the application. When the DM engine cannot find a variable in the local context of the currently active dialog or subdialog, Florence will look for it in the global context file specified by the application's configuration file.

Global context is built using <dictionary> and <var> elements in the same manner as local context built within a dialog file, however global variable definitions are grouped in a separate FXML file. Global context functions in the same way as local context, with one exception: the NLU results will only be stored locally.

The structure and content of a global context file based on the global.fxml template is generally as follows:

```
<xml>
<fxml>
<global>
<var/>
<array/>
<dictionary/>
</global>
</fxml>
</xml>
```

The <var>, <array> and <dictionary> tags used in a global context file have name= and expr= attributes and can also contain nested <var> and <value> tags. Thus, in practice, a global context file used by an application might look more like the following:

```
<xml>
<fxml>
<global>
<var name="globalTest" expr="2" />
<var name="globalIncrementTest" expr="0" />
<array name="globalNames">
<value expr="1.3.1 Action without arguments but with global context array." />
</array>
<dictionary name="globalDictionaryTest"> <var name="test" expr="1.4.1 Action without
arguments but with global context array."/>
</dictionary>
</global>
</fxml>
</xml>
```

As with all Florence files, the fxml element tag establishes this as a Florence application file using the FXML schema and serves as a container for all other FXML tags used in this file. The global tag establishes the file as a global context file type and contains child elements used to define specific variables and parameters. The var tag is used here to specify global context variables. The array tag is used here to define a global context array. The dictionary tag is used here for a look-up list of global variable names.

Next, we discuss building an RTN FC Dialog File. A Florence application's top-level dialog is most often a dialog based on the Recursive Transition Network (RTN) flow controller (FC) implementation. RTN dialogs are based on the concepts of states and transitions between states.

As with all Florence files, the fxml element tag establishes this as a Florence application file using the FXML schema and serves as a container for all other FXML tags used in this file. The rtn tag establishes this as a dialog based on the RTN FC and contains all the child elements used to build the RTN dialog, including tags to: local to describe local context, subdialogs to identify subdialogs, actiondefs to define actions, states to specify states (with associated instructions), transitions to specify transitions (with associated actions), contextshift to identify context shifts, and chronoshift to identify chronoshifts.

Next is discussed the process of building an output processing template. Many simple applications can use the output processor that's built into Florence, but most complex applications will require their own output processing template—ie, a template to format Florence output. A few different output processing templates are provided with the Florence sample applications. These templates include typical elements, such as confidence level and log level values, identification of the ASR engine being used, and so forth. The best way to understand how to build an output processing template is to examine these models. They may be adapted to the needs of a new application.

The Florence DM engine's built-in output processor uses an application's dialog components in conjunction with its output template to prepare appropriate output in response to user input. In a VoiceTone spoken dialog application such as a customer care system, this output is what will ultimately generate the response to be returned to the customer. This output can take the form of simple text, but most typically the output is formatted by the application's output processor—a VoiceXML template—as VoiceXML code containing speech text prompts. Those speech text prompts are then used by the Natural Voices TTS engine to generate the system's spoken response to the customer.

Two components control the content of output from Florence: the Output Processor and the Action object. The Output Processor formats Florence output into text, VoiceXML, or whatever other type of string output it has been specialized to provide. The content comes from an Action object in the currently active dialog. For the Output Processor to work correctly, it must be able to get the content it needs from the Action object. This creates a strong coupling between these two components; they will usually be created in pairs.

For VoiceXML applications, the <output> element defined in an application's configuration data file must specify a VXML template (such as the VoiceXMLTemplate.vxml file that is supplied with the Florence examples). The VXML template not only uses the text of an action, which is part of a normal action definition, but it can also use arbitrary blocks of VXML code which have been associated with the action.

Output formats are discussed next. Although an output processor can be devised to provide many kinds of string output, the most typical output formats are simple text and VoiceXML: (1) Simple Text Output: For simple text output from an application, specify "text" as the value of the template attribute of the <output> element in the application's configuration data file. The <actiondef> element in a dialog usually includes a text attribute. The value of this attribute determines the output text created by this action through a simple text output processor (ie, the literal text that appears as the value is what will be output). (2) VoiceXML Output: In order to use a VXML template for Florence output, the developer may desire to add a template attribute to the element in the application configuration data file. The value of the template attribute is the pathname (relative to the data directory) of the VXML template file the developer intends to use. The text of this file will be returned every time an action is taken by Florence.

Next is discussed the process of adapting reusable subdialogs for an application. The method of developing a dialog manager preferably includes a step of selecting an available reusable subdialog for each application part. The example reusable dialog is the input subdialog (referred to as the InputSD). The input subdialog is a reusable dialog for collecting input from the user. It is capable of handling silences, rejections, low confidence NLU results, and explicit confirmation and it can be configured with custom prompts and patience levels for each invocation. This section describes how to configure the InputSD, what behavior to expect from it, and how to retrieve results from it. It also includes an example of how to use the InputSD.

The InputSD uses the actions copied to it when it is invoked to handle specific problems that arise during the input process. When a problem arises, the InputSD checks to see if its patience for that sort of problem has been exceeded. If it has, then the dialog fails and ends. If its patience has not been exceeded, the InputSD plays a prompt from the list of prompts that have been sent to the subdialog to apply to special circumstances.

The special circumstances are silence, rejection, and low-confidence NLU value. In the case of an NLU value returned with a low confidence score, the user is given the opportunity to confirm the value with a yes or no answer (unless the dialog is already trying to get a yes/no value). It is also possible to request that the dialog always confirm a value before it is returned. The InputSD handles this in a manner similar to the handling of low-confidence values.

Input values are the local variables that can be configured when the InputSD is invoked. These variables are set using <set> in an <entersubdialog> element. Any prompts that will be used in the InputSD must also be copied in this instruction set with a <copy> element. See the sample code at the end of this section for an example.

Allowed input values include: InputPrompt—this is the name of the prompt to play when the InputSD begins; YN—set this to "true" if the dialog is being invoked to collect a yes or no response (it defaults to "false"); YvalueName—this is the value that the dialog will recognize as "yes" (it defaults to "discourse_yes"); NvalueName—this is the value that the dialog will recognize as "no" (it defaults to "discourse_no"); SilenceCategory—this is the value that the dialog will recognize as a silence (it has no default); RejectCategory—this is the value that the dialog will recognize as a rejection (it has no default); ConfidenceThreshold—the input must have a confidence level above this threshold (it defaults to 0); and ExplicitConfirm—if this dialog must always confirm responses, set this to "true" (it defaults to "false").

Each of the following variables describes how many times the dialog will tolerate a particular type of input failure before failing. Each defaults to 0: SilencePatience; RejectionPatience; ConfidencePatience—this applies to low-confidence, unconfirmed inputs; and confirmPatience—this is the number of times an explicit confirmation can receive a "no" answer.

The following variables are action names. Local context array variables (the <array> elements within the <local> element of an RTN FC dialog file) must be copied into these values. There must also be an action for each of the names given, and each of these actions must be copied using the copy action instruction (<copy>). The InputSD iterates over each of these sets of actions for a particular type of input situation. If the counter value of the iteration exceeds the size of the array, the last value will be used again: SilenceActions; RejectionActions; ConfidenceActions—this action prompts the user for a yes/no confirmation of a low-confidence input; ConfirmRequestActions—this action prompts the user for a yes/no explicit confirmation; ConfirmActions—these prompts are called if the explicit confirmation or a low-confidence confirm gets a "no" response.

The following failure actions occur when the patience for a particular situation is exceeded. These variables each contain the name of an action, which must be copied separately with copy action instruction (<copy>): SilenceFailAction; RejectionFailAction; ConfidenceFailAction; and ExplicitConfirmFailAction.

These are the local variables that can be retrieved when the InputSD is finished: ReturnConcept—the NLU concept that was the InputSD received; ReturnValue —the text received by the InputSD; ReturnConfidence—the confidence score of the result; result—the actual NLU result; and Success—true or false. These variables are retrieved using SetInstruction in an instruction set with subDialogInstructions set to "true" and enterInstructions set to "false".

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Although AT&T's Florence framework and other speech products are discussed, the present invention is certainly not limited to any such specific method or product. Furthermore, the invention is not limited to a specific standard or protocol in developing speech applications. It may be applied to existing speech platforms and used in connection with industry standards such as VXML and SALT to address complex dialog strategies. Accordingly, the appended claims and their legal equivalents should only define the invention, rather than any specific examples given.

We claim:

1. A method comprising:
    selecting a top level recursive flow controller from a database, wherein the top level recursive flow controller isolates subdialog information of each subdialog in a plurality of subdialogs from other subdialogs in the plurality of subdialogs;
    selecting, for a portion of an application below the top level recursive flow controller, an available reusable subdialog from the plurality of subdialogs; and
    developing, via a processor and for a spoken dialog service, a subdialog for each remaining portion of the application not associated with the available reusable subdialog.

2. The method of claim 1, wherein the available reusable subdialog is isolated from application dependencies of the application, the application dependencies being specific information provided to the application.

3. The method of claim 2, wherein the application dependencies are declared outside of code used for the developing of the available reusable subdialog.

4. The method of claim 1, wherein the application uses dialog components in conjunction with an output template of the application in providing output in response to user input.

5. The method of claim 1, wherein the available reusable subdialog and a developed subdialog manage mixed-initiative conversations with a user.

6. The method of claim 1, wherein the available reusable subdialog provides information to a user.

7. The method of claim 1, wherein the available reusable subdialog is selected to obtain one of a telephone number, a social security number, an address, and an account number.

8. A system comprising:
    a processor; and
    a computer-readable storage device having instructions stored which, when executed by the processor, cause the processor to perform operations comprising:
        selecting a top level recursive flow controller from a database, wherein the top level recursive flow controller isolates subdialog information of each subdialog in a plurality of subdialogs from other subdialogs in the plurality of subdialogs;
        selecting, for a portion of an application below the top level recursive flow controller, an available reusable subdialog; and
        developing, for a spoken dialog service, a subdialog for each remaining portion of the application not associated with the available reusable subdialog.

9. The system of claim 8, wherein the available reusable subdialog is isolated from application dependencies of the application, the application dependencies being specific information provided to the application.

10. The system of claim 9, wherein the application dependencies are declared outside of code used for the developing of the available reusable subdialog.

11. The system of claim 8, wherein the application uses dialog components in conjunction with an output template of the application in providing output in response to user input.

12. The system of claim 8, wherein the available reusable subdialog and a developed subdialog manage mixed-initiative conversations with a user.

13. The system of claim 8, wherein the available reusable subdialog provides information to a user.

14. The system of claim 8, wherein the available reusable subdialog is selected to obtain one of a telephone number, a social security number, an address, and an account number.

15. A computer-readable storage device having instructions stored which, when executed by a computing device, cause the computing device to perform operations comprising:
    selecting a top level recursive flow controller from a database, wherein the top level recursive flow controller isolates subdialog information of each subdialog in a plurality of subdialogs from other subdialogs in the plurality of subdialogs;
    selecting, for a portion of an application below the top level recursive flow controller, an available reusable subdialog; and
    developing, via a processor and for a spoken dialog service, a subdialog for each remaining portion of the application not associated with the available reusable subdialog.

16. The computer-readable storage device of claim 15, wherein the available reusable subdialog is isolated from application dependencies of the application, the application dependencies being specific information provided to the application.

17. The computer-readable storage device of claim 16, wherein the application dependencies are declared outside of code used for the developing of the available reusable subdialog.

18. The computer-readable storage device of claim 15, wherein the application uses dialog components in conjunction with an output template of the application in providing output in response to user input.

19. The computer-readable storage device of claim 15, wherein the available reusable subdialog and a developed subdialog manage mixed-initiative conversations with a user.

20. The computer-readable storage device of claim 15, wherein the available reusable subdialog provides information to a user.

* * * * *